Nov. 26, 1963 R. COLOMBO 3,111,711
MACHINE FOR BLOW-MOULDING HOLLOW ARTICLES
Filed March 5, 1963 4 Sheets-Sheet 4

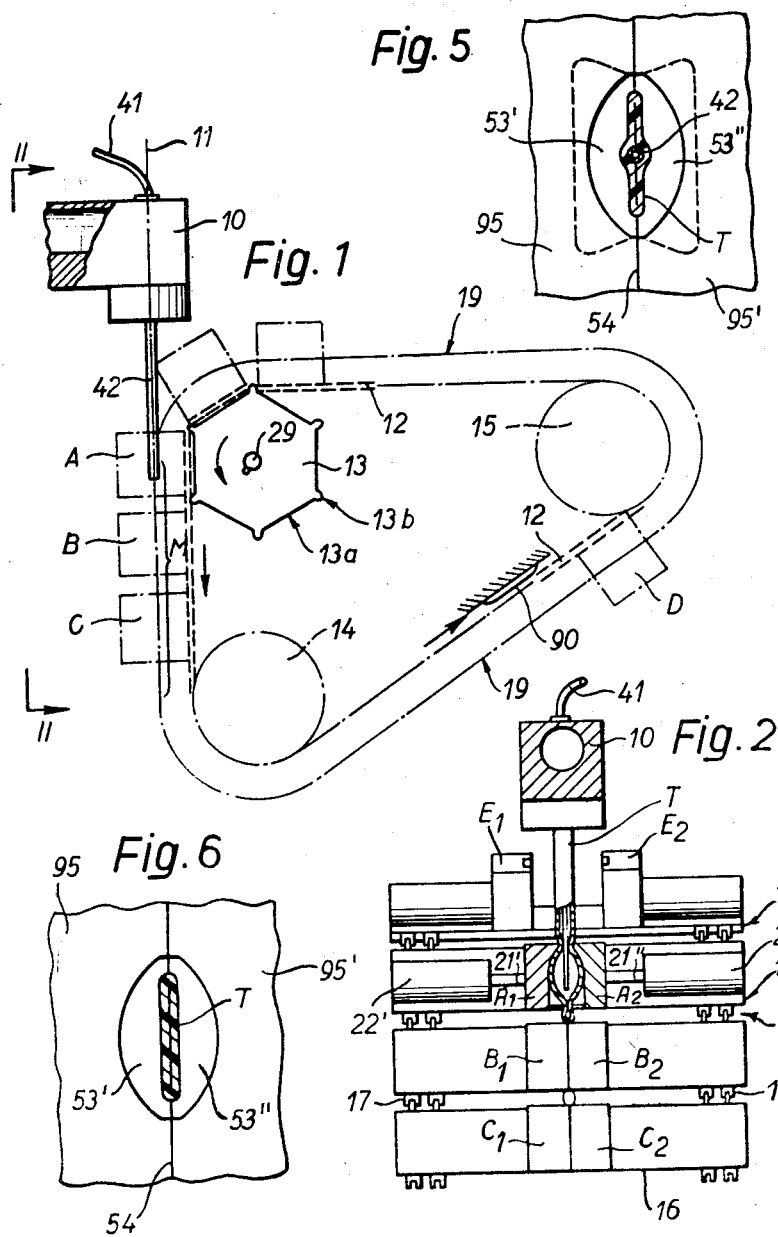

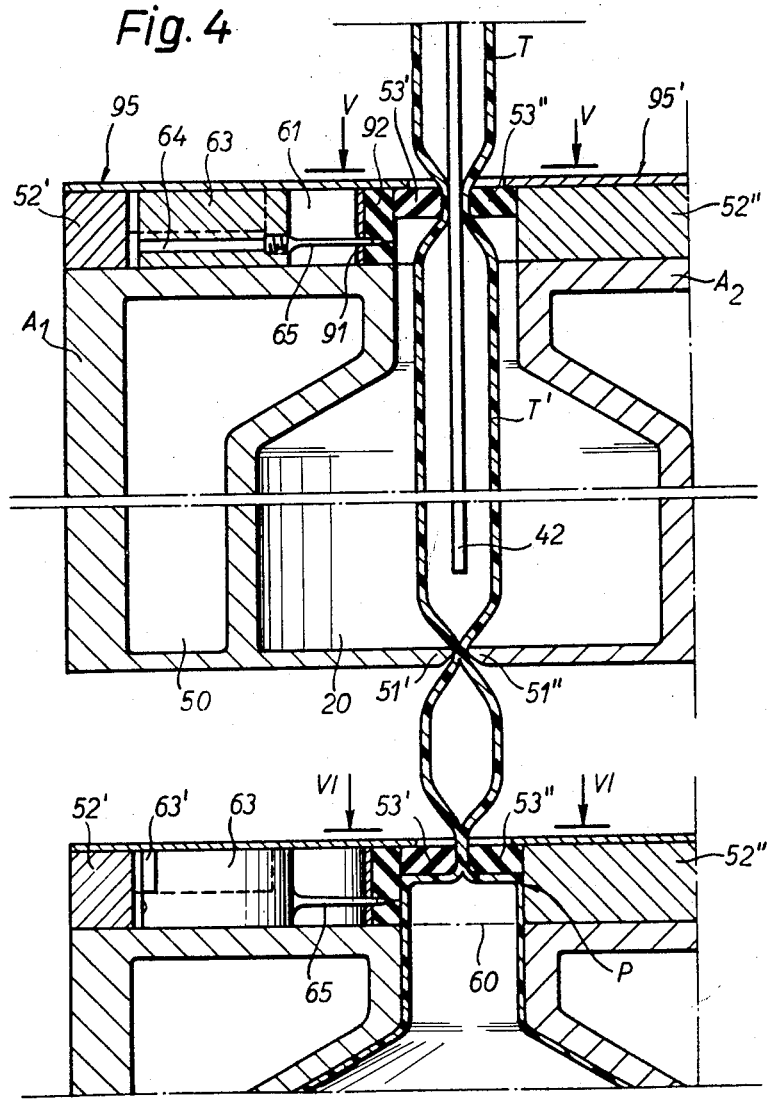

INVENTOR

BY

ATTORNEY 3,111,711
MACHINE FOR BLOW-MOULDING
HOLLOW ARTICLES
Roberto Colombo, Turin, Italy, assignor to Lavorazione Materie Plastiche-L.M.P. S.p.A., Turin, Italy
Filed Mar. 5, 1963, Ser. No. 262,986
Claims priority, application Italy Apr. 6, 1962
3 Claims. (Cl. 18—5)

This invention relates to the manufacture of hollow articles, more particularly bottles, from synthetic thermoplastic material, such as polyethylene, polyvinyl chloride and the like.

More particularly the invention relates to the manufacture of such articles by extrusion from a heat softened tubular blank of thermoplastic material and expansion of consecutive sections of the said blank by means of compressed air or other fluid in divided moulds travelling over a closed path which is superposed in part on the path of the blank issuing from the extrusion die.

An object of this invention is to provide a machine affording an exceptionally high rate of production and a relatively small number of travelling moulds.

A further object of this invention is to provide a machine which is particularly suitable for moulding bottles and similar articles which are extremely thin-walled, both in order to economise thermoplastic material and manufacture small bottles or containers for use as atomisers for liquid generally.

It is known, for instance, that the walls of such atomisers (which operate by collapsing of the bottle) easily crack and split if the wall is not sufficiently thin. On the other hand, the manufacture of extremely thin-walled bottles involves operations following one another at very high speed (in order to prevent cooling and part setting of the blank before the latter has duly expanded). Moreover, such bottles easily burst under the action of internal pressure when the mould is opened for stripping the just moulded bottles. Since, in order to perform quick blowing relatively high air pressure should be employed as compared with the small wall thickness of the bottle, the consequence is that the said thickness cannot be reduced at will, at least as long as the machines known heretofore are employed.

The present position in the art is therefore as follows: while improvements in extrusion presses have made possible very high rates of extrusion, the progress of the moulding units has been relatively slow, especially in the case considered above of the manufacture of small thin-walled atomiser containers. As compared with large containers or bottles of greater wall thickness, requiring processing of larger volumes of thermoplastic material, the rate of production of the above mentioned small bottles is on present-day machines rather low.

This invention provides a machine obviating the above and further drawbacks met with heretofore. This machine according to the invention comprises a downwardly directed extrusion die adapted to extrude a tubular blank of the said material softened by the action of heat; a blowing tube extending downwardly from the die coaxially with the latter, the said tube being of a rigid heat-conducting material and of a diameter substantially smaller than the extrusion die, so that the extruded blank is out of contact with the tube; at least one divided hollow mould ending at one end by a pair of jaws adapted tightly to clamp a region on the blank situated beneath the lower end of the tube, having at its opposite end a pair of rubber pads adapted to clamp a further region of the blank on the tube, whereby the blank section between the two regions can be expanded in the mould by the action of compressed air supplied through the tube, the said rubber pads being adapted fully to clamp therebetween the said further blank region in the absence of the tube at the said region; means for moving the mould along the tube and beyond the lower end of the latter over a closed path including a stripping station; a stationary cam arranged on part of the path ahead the stripping station; and piercing means incorporated by the divided mould, operated by the same cam adapted to pierce the wall of the expanded blank in the mould at the region adjacent the said pair of rubber pads, in order to relieve the pressure in the blank before the latter is stripped.

Further details and advantages of the said machine according to the invention will be more clearly understood from the following description referring to the accompanying drawings which show one particular embodiment thereof, and wherein:

FIGURE 1 is a general diagram of a bottle moulding machine;

FIGURE 2 is a view in the direction of the arrows II—II of FIGURE 1;

FIGURE 4 is a fragmentary axial sectional view showing two consecutive operating moulds;

FIGURES 5 and 6 are cross sectional views on lines

Figure 8:
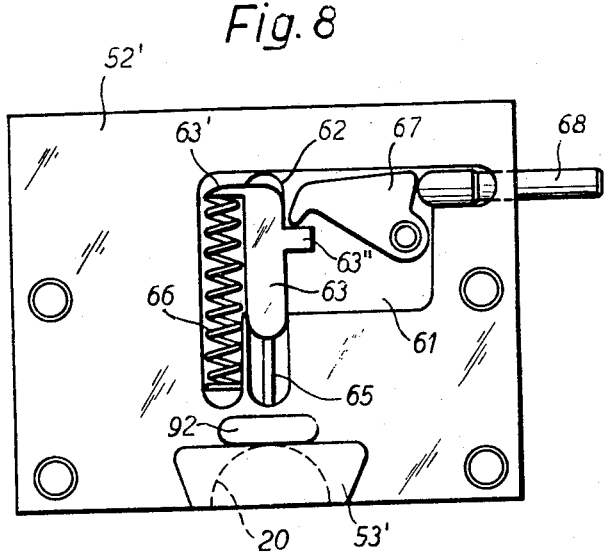
Figure 9:
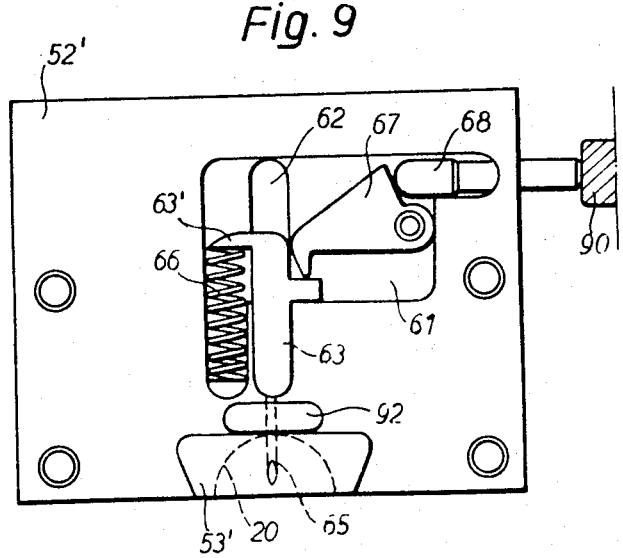

mould shortly before the stripping step;

FIGURES 8 and 9 show the piercing device in its inoperative and operative conditions, respectively.

Referring first to FIGURES 1 and 2 an extrusion press for thermoplastic material (such as polyethylene, polyamide resins, polyvinyl resins and the like) comprises an extrusion head 10 adapted vertically to extrude in a downward direction a softened tube T of the said material over a vertical path the upper extension of which is denoted by 11. Four divided moulds A, B, C, D of a plurality of moulds are shown to be supported by an endless conveyor chain 12 travelling over sprocket wheels 13, 14, 15. The chain or sprocket 12 comprises a plurality of rectangular supporting plates 16, successively hinged to one another by means of hinges 17 arranged on the larger sides of the rectangular plates. The sprocket wheel 13 is of a hexagonal contour, each side 13a of which equals in length the small side of the plate 16, whereby teeth 13b in the sprocket wheel 13 are engageable by gaps 18 between the individual plates and move the latter in the direction indicated by the arrows in FIGURE 1. The shaft 29 for the sprocket wheel 13 is connected in a manner known per se to an adjustable speed motor (not shown).

It will be understood that each of the sprocket wheels 13, 14, 15 shown in FIGURE 1 has associated therewith an identical twin wheel arranged on the same shaft to form a wheel pair. Sprocket conveyors of this type are generally known and do not therefore require further description.

During movement of the sprocket 12 the moulds A, B, C, D, . . . are fed over an endless closed path 19 which is superposed on the path 11 of the tube T at the region denoted by the bracket M. The length of the said superposition is not particularly critical to this invention. It is, however, essential for one mould to be at a given moment aligned with the axis of the tube T and move downwardly along the said axis.

In FIGURE 1 the moulds A, B, C have been shown in the above mentioned aligned position, while it is assumed that the mould D is at the stripping region for the moulded article.

Each mould A, B, C, D, . . . comprises two mould halves A1, A2; B1, B2; C1, C2; etc. which define together a moulding hollow 20 (FIGURE 4) and are slidably mounted on their respective plate 16 longitudinally of the molding hollow or perpendicularly to the direction of movement of the mould. The mould half A1 is secured to the end of the piston rod 21' of a hydraulic ram 22', while the mould half A2 is secured to the end of the piston rod 21'' of a similar ram 22'', the two rams being secured to the opposite end portions of the plate 16. The rams are of the double-acting type so that on supplying thereto a hydraulic fluid the mould halves A1, A2; B1, B2; etc. can be drawn apart (compare E1, E2 in FIGURE 2) or drawn together under pressure. The rams 22', 22'' therefore act as means for opening and closing the moulds, independently of the special supply and control device which may be of any suitable known type.

Figure 3:
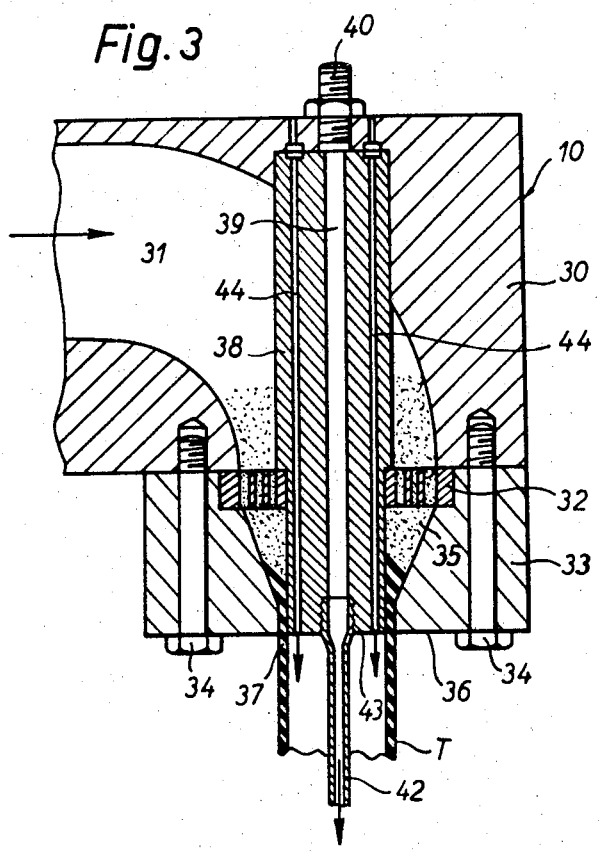
FIGURE 3 is an axial sectional view of the extrusion head employed by the machine shown in FIGURES 1 and 2.

The extrusion head 10 (FIGURE 3) comprises a portion 30 secured to a press supplying the softened plastic material, the said portion 30 being formed with a tubular passage 31 which is curved to vertically open in a downward direction. At the opening of the passage 31 a grid 32 is clamped against the portion 30 by means of a member 33 and bolts 34. The member 33 is formed with a conical aperture 35 connecting at one end with the passage 31 and opening at its other end on the lower face 36 of the member 33 in a vertical downward direction.

A cylindrical spindle 38 is mounted in the head 10 on the axis of the aperture 35. The lower end of this spindle 38 is flush with the face 36 and defines together with the member 33 an annular extrusion passage 37. The spindle 38 is formed with an axial bore 39 connecting at the top with a nipple 40 (FIGURE 3) which can be connected through a conduit 41 (FIGURE 1) with a source of compressed air. A blower tube 42 is screwed into the bottom end of the bore 39 and extends downwardly (in the direction of extrusion) over a substantial length into the region M (FIGURE 1) at which the paths 11, 19 superpose. The outer diameter of the blower tube 42 is substantially smaller than the bore of the annular passage 37, so that the thermoplastic tube T freely descends without touching the tube 42. An annular region 43 is thereby left free between the tube 42 and passage 37 on the bottom front face of the spindle 38, passages 44 opening at this region and reaching within the spindle to freely open to the outside. The outer surface of the blower tube 42 is completely smooth, preferably of a specular polish.

The mould halves A1, A2; B1, B2; etc. (FIGURE 4) are each provided with a cooling jacket 50 fed with water in any convenient manner. The moulding hollow 20 is limited at its bottom by a pair of clamping jaws 51', 51'' associated with their respective mould halves, adapted to tightly clamp a region of the extruded blank T when the mould closes in alignment therewith.

The top jaws each comprise at metal plate 52', 52'' bolted to its respective mould half A1, A2 in a plane perpendicular to the longitudinal axis of the mould, and a rubber pad 53', 53'', respectively, embedded into the marginal zone of its respective mould half which on closure would contact the outer blank T. The pads 53', 53'' are preferably made of a silicone rubber, which is relatively unaffected by heat. The pads are preferably rechangeable, although they can be permanently incorporated by their respective plates, such as by vulcanization. When the mould is closed empty, the two pads come into contact with each other along a line 54 (FIGURES 5 and 6) separating the two mould halves; moreover, they extend along the said line over a length substantially exceeding the diameter of the blower tube 42, preferably greater than the half-circumference of the blank T, whereby the latter is collapsed exclusively by action of the pads on closure of the mould. In operation the moulds close one after another as they reach the position indicated by A in FIGURE 1. In this manner the rigid bottom jaws 51', 52'' close over a zone of the extruded blank T which is slightly beneath the lower end of the tube 42 and collapse this zone in a pressure-tight manner, as will be seen from FIGURE 4, thereby welding together the blank walls. The rubber pads 53', 53'' close over a zone of the blank T having still extending therethrough the blower tube 42 and resiliently clamp this zone therebetween and on the tube 42, still in a fluid-tight manner, as will be seen in FIGURE 5.

On closure of a mould in the above described manner and as the mould further moves downwardly along the straight line 11 (FIGURE 1), compressed air is supplied through the blower tube 42 under a sufficient pressure to expand as rapidly as possible the section T' of the blank T enclosed by the mould. Quick initial expansion of the compressed air supplied through the blank T subtracts heat from the latter, so that the zone of blank T clamped between the rubber pads and tube easily slides on the latter without sticking thereto.

When the mould is about to leave the tube 42, supply of compressed air is intercepted. Start and end of the air supply are easily controllable such as by means of electric micro-switches arranged on the mould path and connected in the control circuit of an electromagnetic valve adapted to open and close the air supply to the tube 42. As the mould leaves the tube 42, the rubber pads fully clamp the blank T to maintain pressure in the mould (compare FIGURE 6 and the bottom portion of FIGURE 4). As the mould moves forward along its path, the bottle formed therein cools and sets; at the same time further moulds reach in a sequence the tube 42 in alignment therewith to perform the above described operations.

It will be seen from FIGURE 4 that the plates 52', 52'' cooperate in defining the portion of the moulding hollow 20 in which the bottle neck or an extension P is formed on the said neck which is subsequently removed by cutting along the plane 60 after stripping of the bottle.

One of the two plates (in the example shown, plate 52') is formed with a recess 61 and a slot 62 (FIGURES 8 and 9) extending perpendicular to the longitudinal axis of the mould. The slot has slidable therein a slide 63 in the form of an elongated metal block having two lateral extensions 63', 63''. The slide 63 is formed with a longitudinal bore 64 and carries a hollow needle 65, screwed into the bore 64, extending perpendicular to the mould axis.

Figure 7:
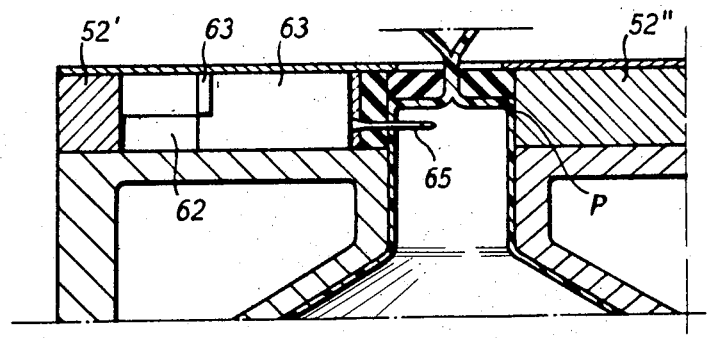
FIGURE 7 is a fragmentary axial sectional view of a V—V and VI—VI of FIGURE 4.

A pressure spring 66 acting against the extension 63' on the slide tends to draw the slide and needle away from the mould axis (FIGURE 8). The extension 63'' has cooperating therewith a bell crank lever 67 actuated by a plunger or tappet 68 projecting to the outside from the plate 52'. When the tappet 68 is pushed inwardly of the plate, the lever 67 moves the slide 63 and needle 65 along the mould axis. To this end a stationary cam 90 is arranged at a region of the path 19 (FIGURE 1) of the moulds ahead the stripping station D, and extends parallel with the path 19 by a length such as of 20 cm. When a mould is about to pass the cam the tappet 68 rides on the cam and is moved to the position indicated in FIGURE 9, in which the needle 65 enters the moulding hollow 20 (see also FIGURE 7) and pierces the wall of the extension P on the bottle neck. Consequently, immediately before stripping the inside of the bottle is connected with the outside through the needle 65 and bore 64 in the slide 63, so that the air pressure in the bottle is actually relieved.

It is thereby possible rapidly to manufacture extremely thin-walled bottles, which would not withstand the internal pressure should the bottle have to be stripped without making use of this invention.

The free end of the needle 65 is guided in an orifice 91 bored in the plate 52' and is normally concealed within a block 92 of relatively soft rubber. The pill is fitted into a recess adjacent the pad 53' and acts as a bar for the thermoplastic material which is being expanded in the mould, so that the air pressure forces the material against the block 92 which closes under this pressure on the needle end. The thermoplastic material is thereby prevented from being penetrated by the needle; on the other hand, the abutment formed by the block 92 prevents the internal pressure from piercing the wall of the blank T' at the needle region.

In order to prevent accidental slipping off of the pads 53', 53" and block 92 from their respective seats under the expansion pressure set up through the blower tube 42, the two plates 52', 52" are provided with metal plates 95, 95' which in the closed mould condition leave free therebetween a relatively small aperture (FIGURES 5 and 6) just sufficient to enable the pads to clamp the blank T without disturbance.

It will be understood that the above described machine as shown on the drawings can be modified in various manners without departing from the scope of the invention as defined in the appended claims. Moreover, certain constructional details of the machine have been neither described nor illustrated, as they are not a part of this invention. For instance, it will be obvious that a synchroniser can be advantageously provided between the shaft 29 for the sprocket wheel 13 and extrusion press control, to cause the travelling speed of the moulds to substantially equal the rate of extrusion of the blank T. Moreover, the sprocket wheel 15 can be omitted in many cases, whereby the number of travelling moulds can be considerably reduced.

What I claim is:

1. Machine for manufacturing hollow articles of synthetic thermoplastic material, by an extrusion and blowing process, comprising, a downwardly extending extrusion die adapted to extrude a tubular blank of the said material in a heat-softened condition; a blower tube extending downwardly from the extrusion die coaxially with the latter, the said tube being made of a rigid heat-conducting material and being of a diameter substantially smaller than the nozzle diameter, so that the extruded blank is out of contact with the tube; at least one divided mould ending at one end by a pair of jaws adapted tightly to clamp a region of the blank situated beneath the bottom end of the tube, and having at its opposite end a pair of rubber pads adapted to clamp a further region of the blank on the tube, whereby the section of the blank between the two regions can be expanded in the mould by means of compressed air supplied through the tube, the said rubber pads being adapted fully to clamp therebetween the said other zone of the blank in the absence of the tube at said region; means for moving the mould along the tube and beyond the bottom end of the latter over a close path including a stripping station; a stationary cam arranged on part of the path ahead the stripping station; and piercing means incorporated by the divided mould, actuated by the said cam to pierce the wall of the expanded blank in the mould at a region adjacent the said pair of rubber pads, thereby to reduce the pressure in the blank before stripping of the latter.

2. Machine as claimed in claim 1, wherein a wall region of the mould adjacent the said pads includes a rubber block, and wherein the said piercing means comprises a hollow needle having its sharp end normally occluded by said block with respect to the mould hollow, and tappet means co-operating with the said cam to force the needle through the block into the mould hollow.

3. Machine as claimed in claim 2, wherein the hollow needle is supported by a slide urged by a spring towards the occluded needle position, and wherein the cam and tappet means act against the return action of the said spring.

References Cited in the file of this patent
UNITED STATES PATENTS

| | | |
|---|---|---|
| 2,310,404 | Dodge | Feb. 9, 1943 |
| 2,954,581 | Colombo | Oct. 4, 1960 |